United States Patent
Malhotra

(10) Patent No.: US 12,107,874 B2
(45) Date of Patent: Oct. 1, 2024

(54) AUTOMATED INTELLIGENT DETECTION AND MITIGATION OF CYBER SECURITY THREATS

(71) Applicant: FMR LLC, Boston, MA (US)

(72) Inventor: Mrinal Malhotra, Franklin, MA (US)

(73) Assignee: FMR LLC, Boston, MA (US)

( * ) Notice: Subject to any disclaimer, the term of this patent is extended or adjusted under 35 U.S.C. 154(b) by 376 days.

(21) Appl. No.: 16/922,219

(22) Filed: Jul. 7, 2020

(65) Prior Publication Data
US 2021/0014256 A1  Jan. 14, 2021

Related U.S. Application Data

(60) Provisional application No. 62/871,641, filed on Jul. 8, 2019.

(51) Int. Cl.
| | |
|---|---|
| *H04L 9/40* | (2022.01) |
| *G06F 8/30* | (2018.01) |
| *G06F 9/48* | (2006.01) |
| *G06N 5/02* | (2023.01) |

(52) U.S. Cl.
CPC ............ *H04L 63/1425* (2013.01); *G06F 8/30* (2013.01); *G06N 5/02* (2013.01); *H04L 63/205* (2013.01); *G06F 9/48* (2013.01)

(58) Field of Classification Search
CPC ..... H04L 63/1425; H04L 63/205; G06F 8/30; G06F 9/48
See application file for complete search history.

(56) References Cited

U.S. PATENT DOCUMENTS

| | | | |
|---|---|---|---|
| 8,621,634 B2 * | 12/2013 | Turbin | G06F 21/564 |
| | | | 706/62 |
| 9,622,161 B1 * | 4/2017 | Law | H04W 48/16 |
| 9,756,070 B1 * | 9/2017 | Crowell | G06F 21/56 |
| 9,940,104 B2 | 4/2018 | Vann | |
| 10,075,463 B2 * | 9/2018 | Zhang | H04L 63/1425 |
| 10,129,290 B2 | 11/2018 | Thomas et al. | |

(Continued)

OTHER PUBLICATIONS

Alberto Perez Veiga, Applications of Artificial Intelligence (AI) to Network Security, Mar. 2018, University of Maryland University College (Year: 2018).*

*Primary Examiner* — Luu T Pham
*Assistant Examiner* — Saad Ahmad Abdullah
(74) *Attorney, Agent, or Firm* — Cesari & McKenna, LLP

(57) ABSTRACT

Methods and apparatuses are described for automated intelligent detection and mitigation of cyber security threats. A server receives application log data from application servers and analyzes the log data to identify indicia of potential cyber security threats. The server executes a trained threat modeler against the log data and the indicia of potential cyber security threats to identify indicia of actual cyber security threats. The server determines whether a remediation action exists for the identified actual cyber security threats. If a remediation action exists: the server executes the remediation action at the application servers to resolve the actual cyber security threat. If a remediation action does not exist: the server generates remediation parameters based upon the indicia of the actual cyber security threat, generates source code for a software package based upon the remediation parameters, and executes the software package at the application servers to resolve the cyber security threat.

10 Claims, 8 Drawing Sheets

(56) References Cited

U.S. PATENT DOCUMENTS

| | | | |
|---|---|---|---|
| 10,885,393 B1* | 1/2021 | Sirianni | G06F 18/2411 |
| 10,924,503 B1* | 2/2021 | Pereira | H04L 63/20 |
| 11,416,608 B2* | 8/2022 | Momeni Milajerdi | |
| | | | G06F 21/552 |
| 11,514,171 B2* | 11/2022 | Dinh | G06N 5/022 |
| 2014/0089891 A1 | 3/2014 | Reyes Lozano et al. | |
| 2016/0004868 A1* | 1/2016 | Robke | G06F 21/604 |
| | | | 726/25 |
| 2018/0083988 A1 | 3/2018 | Kataoka et al. | |
| 2018/0159887 A1 | 6/2018 | DiGiambattista et al. | |
| 2018/0276372 A1* | 9/2018 | Crabtree | G06F 9/455 |
| 2019/0163886 A1* | 5/2019 | Mahkonen | H04L 63/1433 |
| 2019/0250937 A1* | 8/2019 | Thomas | G06F 9/5083 |

\* cited by examiner

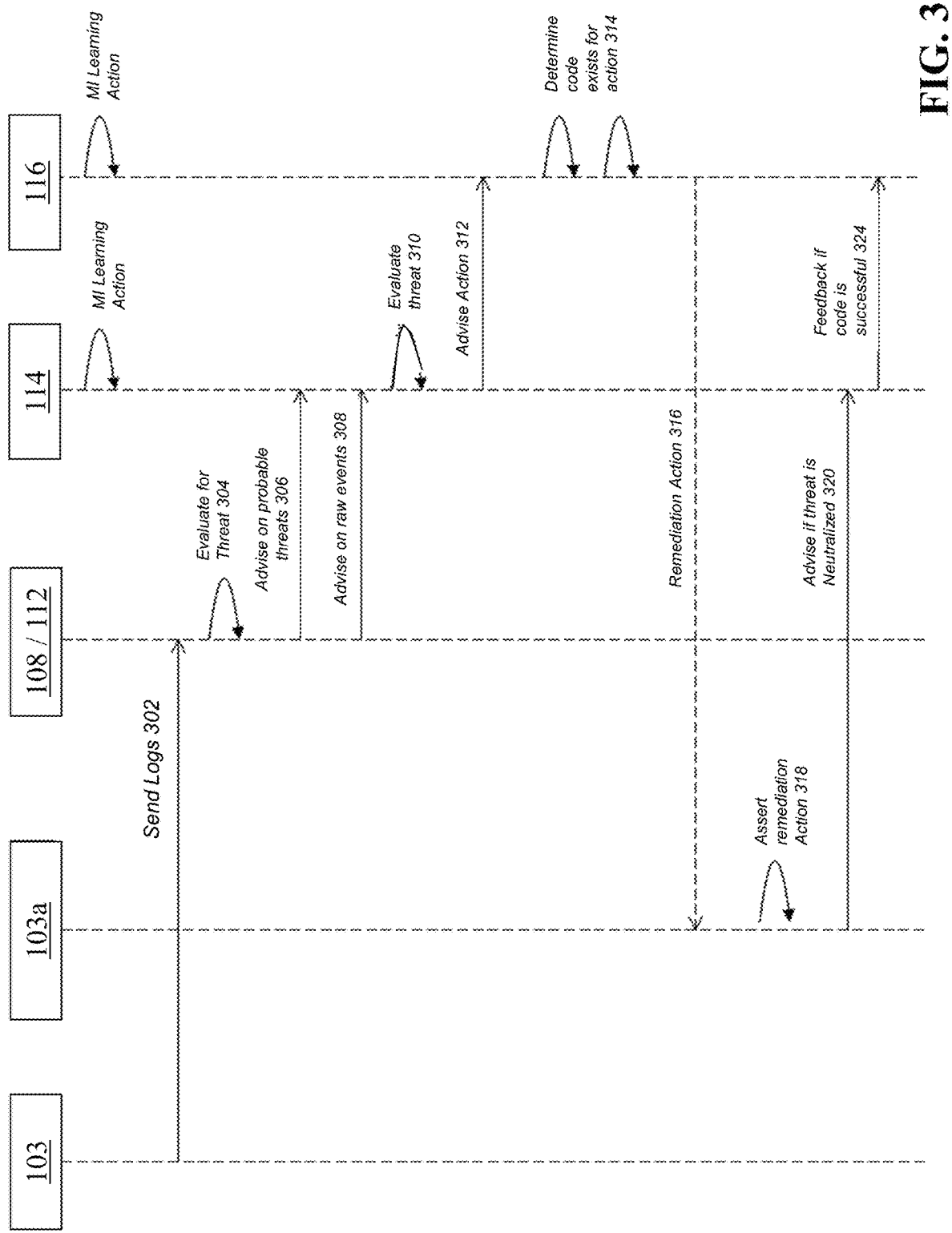

```
{
  "eventVersion": "1.05",
  "userIdentity": {
    "type": "AssumedRole",
    "principalId": "AIDACKCEVSQ6C2EXAMPLE",
    "arn": "arn:aws:iam::444455556666:user/Alice",
    "accountId": "444455556666",
    "accessKeyId": "AKIAI44QH8DHBEXAMPLE",
    "sessionContext": {
      "attributes": {
        "mfaAuthenticated": "false",
        "creationDate": "2018-06-14T22:54:20Z"
      },
      "sessionIssuer": {
        "type": "Role",
        "principalId": "AIDACKCEVSQ6C2EXAMPLE",
        "arn": "arn:aws:iam::444455556666:user/Alice",
        "accountId": "444455556666",
        "userName": "Alice"
      }
    }
  },
  ..........
  "requestParameters": {
    "detectorId": "5ab04b1110c865eecf516eee2435ede7",
    "name": "Example",
    "format": "TXT",
    "activate": false,
    "location": "ec2:instance"
  },
  "responseElements": {
    "threatIntelSetId": "1ab200428351c99d859bf61992460d24"
  },
  ..................................
}
```

FIG. 4

```
public class SifterExtractor
{ private static HashMap<String,String> extractAwsParams(String AwsEvent) {
        HashMap<String,String> eventAttributes = new HashMap<String,String>();
        JAXBContext jaxbContext;
        try
        {
            jaxbContext = JAXBContext.newInstance(AwsEvent.class);
            Unmarshaller jaxbUnmarshaller = jaxbContext.createUnmarshaller();

//Set JSON type
            jaxbUnmarshaller.setProperty(UnmarshallerProperties.MEDIA_TYPE, "application/json");

jaxbUnmarshaller.setProperty(UnmarshallerProperties.JSON_INCLUDE_ROOT, true);

AwsEvent event = (AwsEvent) jaxbUnmarshaller.unmarshal(AwsEvent);

eventAttributes.add ("ARN", event.userIdentity.arn);
            eventAttributes.add ("Account", event.userIdentity.account);
            eventAttributes.add ("MFA",
event.userIdentity.sessionContext.mfaAuthenticated);
            eventAttributes.add ("Username",
event.userIdentity.sessionIssuer.userName);
            eventAttributes.add ("AccessPoint", event.requestParameters.location);
        }
        catch (JAXBException e)
        {
            e.printStackTrace();
        }
return eventAttributes
    }
}
```

FIG. 5

```
eventAttributes [
ARN=arn:aws:iam::444455556666:user/Alice,
Account= 444455556666,
MFA= false,
Username=Alice
AccessPoint= "https://s3.amazonaws.com/bucket.name/file.txt
]
```

FIG. 6

*Potential Cyber Security Threat Indicia*

```
eventAttributes [
ARN=arn:aws:iam::444455556666:user/Alice,
Account=444455556666,
MFA=false,
Username=Alice
AccessPoint="https://s3.amazonaws.com/bucket.name/file.txt
]
```

702

```
whitelist = tf.constant(["JOHNDOE"])
query = eventAttributes["Username"]

#use broadcasting for element-wise tensor operation
broadcast_equal = tf.equal(whitelist, query) //Simple check. Did John
Doe Login, if not restrict access.

str_bayou = "///call:writeIAMLine type:restrict_user
params:"+eventAttributes["ARN"]+" call:close"
if(!broadcast_equal)
tf.io.write_file(
"bayout_iam_generate", str_bayou, name=restrict_access
)
```

114

704

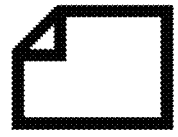

bayout_iam_generate

AUTOMATED INTELLIGENT DETECTION AND MITIGATION OF CYBER SECURITY THREATS

RELATED APPLICATION

This application claims priority to U.S. Provisional Patent Application No. 62/871,641, filed on Jul. 8, 2019, the entirety of which is incorporated herein by reference.

TECHNICAL FIELD

This application relates generally to methods and apparatuses, including computer program products, for automated intelligent detection and mitigation of cyber security threats.

BACKGROUND

Cyber security attacks comprise one of the largest threats to the operation and financial stability of corporations and other organizations. While many types of cyber security attacks can be detected and mitigated, hackers and other fraudulent actors are continuously developing new and previously unknown techniques to gain unauthorized access to enterprise computing systems, including systems that provide sensitive application functionality (such as access to financial and personal information). Current systems for detecting cyber security threats typically fail to account for unforeseen attack strategies, in that these systems do not have remediation packages available to counteract previously unknown cyber security attacks as they happen.

SUMMARY

Therefore, what is needed are methods and systems that can dynamically and intelligently build new software application packages based upon data relating to cyber security threats, in order to mitigate the cyber security threats as they happen.

The invention, in one aspect, features a system for automated intelligent detection and mitigation of cyber security threats. The system comprises a server computing device comprising a memory to store computer-executable instructions and a processor that executes the computer-executable instructions. The server computing device receives application log data from one or more application servers. The server computing device analyzes the application log data to identify a set of one or more indicia of potential cyber security threats. The server computing device executes a trained artificial intelligence threat modeler against the application log data and the set of one or more indicia of potential cyber security threats to identify a set of one or more indicia of actual cyber security threats. The server computing device determines whether a remediation action exists for each of the identified actual cyber security threats. If a remediation action exists for of the identified actual cyber security threat, the server computing device executes the remediation action at the one or more application servers to resolve the identified actual cyber security threat. If a remediation action does not exist for the identified actual cyber security threat, the server computing device generates one or more remediation parameters based upon the one or more indicia of the actual cyber security threat, generates source code for a remediation software package based upon the one or more remediation parameters, and executes the remediation software package at the one or more application servers to resolve the identified actual cyber security threat.

The invention, in another aspect, features a computerized method of automated intelligent detection and mitigation of cyber security threats. A server computing device receives application log data from one or more application servers. The server computing device analyzes the application log data to identify a set of one or more indicia of potential cyber security threats. The server computing device executes a trained artificial intelligence threat modeler against the application log data and the set of one or more indicia of potential cyber security threats to identify a set of one or more indicia of actual cyber security threats. The server computing device determines whether a remediation action exists for each of the identified actual cyber security threats. If a remediation action exists for of the identified actual cyber security threat, the server computing device executes the remediation action at the one or more application servers to resolve the identified actual cyber security threat. If a remediation action does not exist for the identified actual cyber security threat, the server computing device generates one or more remediation parameters based upon the one or more indicia of the actual cyber security threat, generates source code for a remediation software package based upon the one or more remediation parameters, and executes the remediation software package at the one or more application servers to resolve the identified actual cyber security threat.

Any of the above aspects can include one or more of the following features. In some embodiments, the application log data comprises one or more communication events between one or more of the application servers and a remote computing device. In some embodiments, the server computing device receives the application log data in real time.

In some embodiments, the remediation action comprises one or more of: updating a security policy, blocking a communications channel or port, changing one or more application settings, deactivating one or more user accounts, or replacing one or more existing application code modules with updated code modules. In some embodiments, execution of the remediation software package at the one or more application servers to resolve the identified actual cyber security threat comprises: updating a security policy, blocking a communications channel or port, changing one or more application settings, deactivating one or more user accounts, or replacing one or more existing application code modules with updated code modules Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a detailed ladder diagram of a computerized method of automated intelligent detection and mitigation of cyber security threats.

FIG. 4 is a diagram of an exemplary event log for a login event that is received by the data aggregator and analyzed by the security monitor.

FIG. 5 is an exemplary code module that analyzes event log data to generate the indicia of a potential cyber security threat.

FIG. 6 is exemplary output data generated by the security monitor using event log data.

FIG. 7 is a workflow diagram of an exemplary method of identifying one or more indicia of actual cyber security threats.

DETAILED DESCRIPTION

Figure 1:
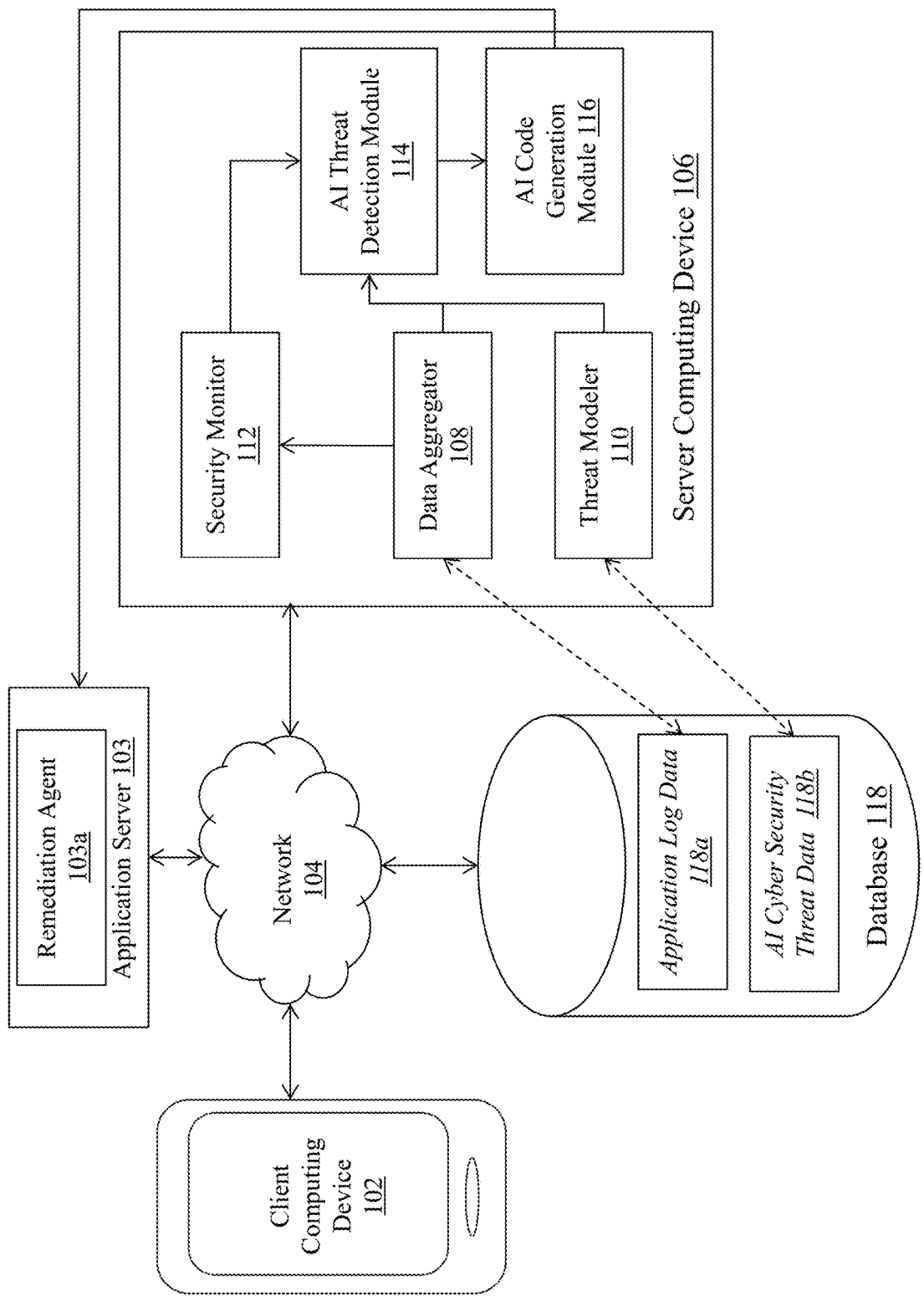
FIG. 1 is a block diagram of a system for automated intelligent detection and mitigation of cyber security threats.

FIG. 1 is a block diagram of a system 100 for automated intelligent detection and mitigation of cyber security threats. The system 100 includes a client computing device 102, an application server 103 with a remediation agent 103a, a communications network 104, a server computing device 106 that includes a data aggregator 108, a security monitor 110, a threat modeler 112, an artificial intelligence (AI) threat detection module 114, and an AI code generation module 116, and a database 118 that includes application logs 118a and AI cyber security threat data 118b.

The client computing device 102 connects to the application server 103 via the communications network 104 to, e.g., interact with one or more web-based or cloud-based software applications available at the application server 103, as will be described herein. Exemplary client computing devices 102 include but are not limited to desktop computers, laptop computers, tablets, mobile devices, smartphones, and internet appliances. However, other types of remote computing devices that connect to the application server 103 can be considered as client computing devices—for example, a server computing device at a remote location can connect to the application server 103 using any number of different connection mechanisms or paradigms (e.g., via tunnel, API, business-to-business (B2B) connection, SaaS, etc.) to interact with the software applications provided by the application server 103. As such, these remote server computing devices are clients for the purposes of the technology described herein. Also, it should be appreciated that other types of computing devices that are capable of connecting to the components of the system 100 can be used without departing from the scope of the technology described herein. It should be appreciated that the system 100 can include any number of client computing devices. And as mentioned above, in some embodiments the client computing device 102 also includes a display for receiving data from the server computing device 106 and displaying data to a user of the client computing device 102.

The client computing device 102 can execute software applications, such as browser applications. In some embodiments, a browser application comprises software executing on a processor of the client computing device 102 that enables the device to communicate via HTTP or HTTPS with remote servers addressable with URLs (e.g., application server 103) to receive software application-related content and services, including one or more webpages, for rendering in the browser application and presentation on a display device embedded in or coupled to the client computing device 102. Exemplary browser application software includes, but is not limited to, Firefox™, Chrome™, Safari™, and other similar software. The one or more webpages can comprise visual and audio content for display to and interaction with a user, including but not limited to web-based software applications that comprise one or more application features (e.g., UI features, application workflow functions, transaction-related commands, and the like).

The application server 103 operates to receive requests from the client computing device 102 and generate user interface screens and/or electronic documents, or execute application-specific features, in response to the requests. In some embodiments, the application server 103 is a web server that executes one or more software applications for use by the client computing devices 102. In some embodiments, the software applications executed by the application server can be operated by a user at the client computing device 102 using browser software located on the client computing device (as described above). For example, the client computing device 102 can launch browser software and connect to the application server 103 via network 104 using a particular Uniform Resource Identifier (URI), such as a web address or URL, to access one or more software applications (e.g., cloud-based applications, Software-as-a-Service (SaaS), etc.) provided by the application server 103. Also, it should be appreciated that many different client computing devices, each operated by a different user, can establish a connection to the application server 103 to access web-based application functions provided by the application server. The application server 103 can generate customized web-based applications, including configuration of a specific set of application features, for each user and/or for specific groups or segments of users (e.g., by requiring a user to provide security credentials such as an ID/password combination to verify the user's identity, confirm that he or she is authorized to access certain functionality, and establish a secure application session (e.g., HTTPS) with the client device 102). The remediation agent 103a is a module or process executing on the application server 103 for the purpose of executing one or more remediation actions on the application server to address or mitigate actual cyber security threats, including the execution of source code, application configuration changes, or policy updates on the application server 103.

The communications network 104 enables the client computing device 102 to communicate with the application server 103, and enables the application server 103 and database 118 to communicate with server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automated intelligent detection and mitigation of cyber security threats as described herein. The server computing device 106 includes a data aggregator 108, a security monitor 110, a threat modeler 112, an artificial intelligence (AI) threat detection module 114, and an AI code generation module 116 that execute on the processor of the server computing device 106. In some embodiments, the modules 108, 110, 112, 114, 116 are specialized sets of computer software instructions programmed onto one or more dedicated processors in the server computing device 106 and can include specifically-designated memory locations and/or registers for executing the specialized computer software instructions.

Although the computing modules 108, 110, 112, 114, 116 are shown in FIG. 1 as executing within the same server computing device 106, in some embodiments the functionality of the modules 108, 110, 112, 114, 116 can be distributed among a plurality of server computing devices. As shown in FIG. 1, the server computing device 106 enables the modules 108, 110, 112, 114, 116 to communicate in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the technology described herein. The exemplary functionality of the modules 108, 110, 112, 114, 116 is described in detail below.

The database 118 is a computing device (or in some embodiments, a set of computing devices) coupled to the server computing device 106 and is configured to receive, generate, and store specific segments of data relating to the process of automated intelligent detection and mitigation of cyber security threats as described herein. In some embodiments, all or a portion of the database 118 can be integrated with the server computing device 106 or be located on a separate computing device or devices. The database 118 can comprise one or more databases configured to store portions of data used by the other components of the system 100, as will be described in greater detail below. In some embodiments, the database 118 functions as a data repository to store computing files in memory and/or on disk. An exemplary database 118 is Cassandra™ available from The Apache Software Foundation (http://cassandra.apache.org/). Other types of 'big data,' scalable databases and/or customized database frameworks can be used within the scope of the technology described herein.

The database 118 includes application log data 118a and AI cyber security threat data 110b, which are dedicated sections of the database 118. The application log data 118a comprises specialized data relating to computing transactions and error data received from, e.g., the application server 103 as various client computing devices attempt to access the functionality provided by the server 103. For example, the application server 103 can generate logs of activity (such as access requests and responses, transaction requests and responses, communication session metadata, application error messages, and the like) based upon communications with the client computing device 102 during an application session. The AI cyber security threat data 118b comprises data and metadata corresponding to known cyber security threats (e.g., viruses, hacking techniques, software code and/or networking vulnerabilities, hardware deficiencies, fingerprints of data breach attempts, and so forth) that could impact one or more of the applications provided by the application server 103. Further detail on the application log data 118a and AI cyber security threat data 118b is provided below.

Figure 2:
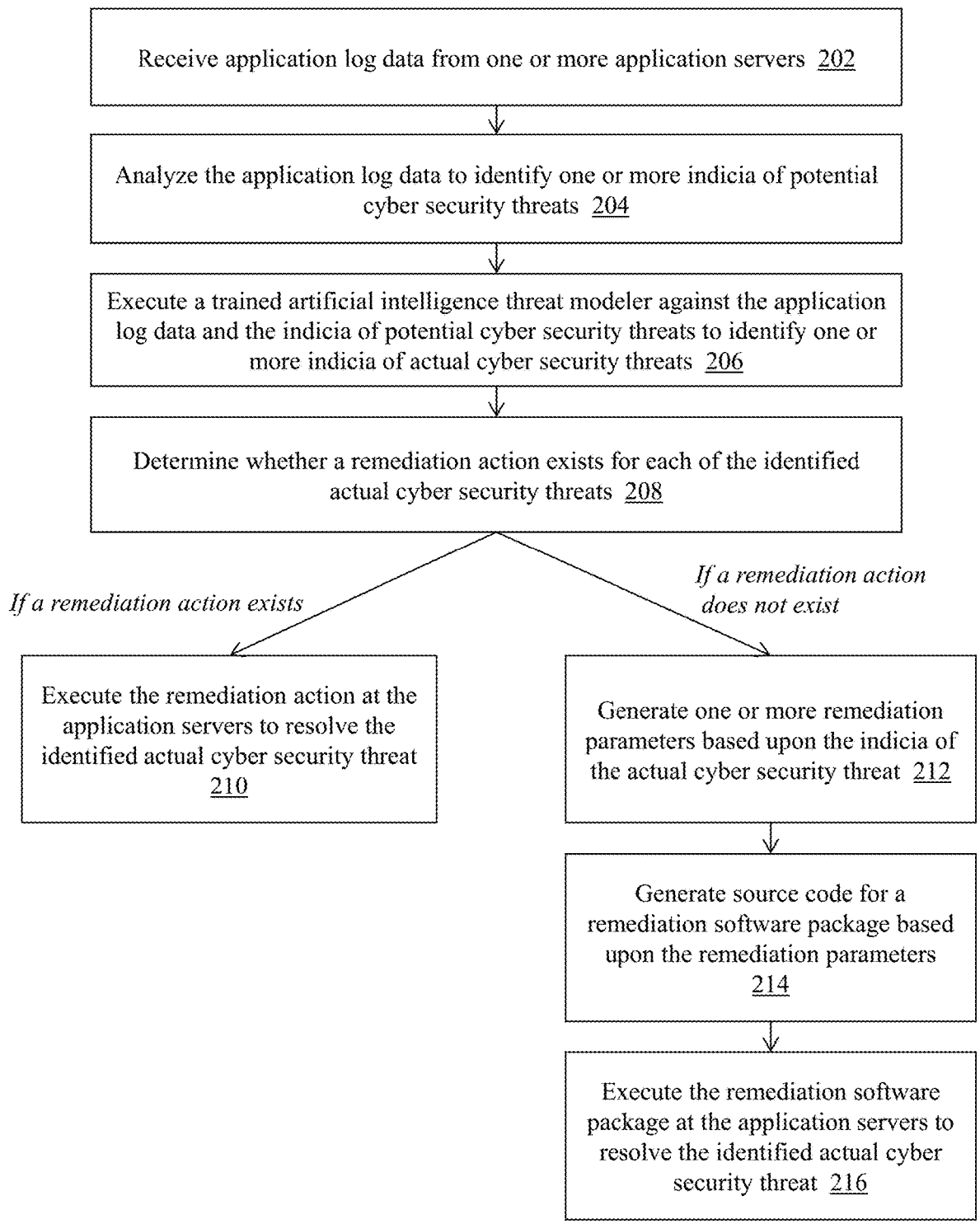
FIG. 2 is a flow diagram of a computerized method of automated intelligent detection and mitigation of cyber security threats.

FIG. 2 is a flow diagram of a computerized method 200 of automated intelligent detection and mitigation of cyber security threats, using the system 100 of FIG. 1. As various client computing devices 102 establish communication sessions with the application server 103 (as described above), the application server 103 captures application log data associated with activity occurring in the communication sessions and transmits the application log data to the database 118 for storage. The data aggregator 108 receives (202) the application log data 118a from the database 118 and in some embodiments, parses and formats the application log data in a form that is usable by the security monitor 112 before transmitting the application log data to the security monitor 112. It should be appreciated that the application log data can, in some embodiments, be stored in database 118 periodically and batch transferred to the data aggregator 108 whereas in some embodiments, the application log data can be stored in database 118 in real-time and immediately transferred to the server computing device 106 for analysis and remediation of real-time threats as described herein.

The security monitor 112 analyzes (204) the application log data received from the data aggregator 108 to identify one or more indicia of potential cyber security threats. For example, the security monitor 112 can analyze communication data and metadata (e.g., network addresses, packet headers/footers, geolocation information), transaction data and metadata (e.g., transaction requests, transaction sequencing and patterns), user and/or client device profile information (e.g., username, device ID, device fingerprint), authentication data and metadata (e.g., security credentials, tokens), and other types of data (e.g., timestamps) to identify whether a potential cyber security threat exists. The security monitor 112 can transmit the indicia of potential cyber security threats to the AI threat detection module 114.

FIG. 4 is a diagram of an exemplary event log for a login event (e.g., an Amazon Web Services (AWS) event) that is received by the data aggregator 108 and analyzed by the security monitor 112. As shown in FIG. 3, the event log comprises a plurality of key-value pairs (e.g., for "eventVersion":"1.05", the key is 'eventVersion' and the corresponding value is '1.05'), each key-value pair comprising an attribute of the login event.

The security monitor 112 utilizes one or more code modules to analyze the event log data to generate output data that comprises the indicia of a potential cyber security threat. FIG. 5 is an exemplary code module (i.e., Java™ class) that analyzes the event log data to generate the output indicia, and FIG. 6 is exemplary output data generated by the security monitor 112 using the event log of FIG. 4. As shown in FIG. 6, the output indicia comprises a plurality of event attributes that relate to the login event which can be used by the AI threat detection module 114 to determine whether an actual cyber security threat exists.

At the same time, the threat modeler 110 receives AI cyber security threat data 118b from the database 118 and generates an AI-based threat classification model using the AI cyber security threat data 118b. For example, the threat modeler 110 can use AI techniques, such as neural networks, vectorization algorithms, and the like to generate a threat classification model that is capable of identifying cyber security threats. As noted above, the AI cyber security threat data 118b comprises information about known cyber security threats and the threat modeler 110 can use advanced AI techniques to build a classification model that can detect patterns and identify similarities between the known cyber security threats and security threats that may be indicated in the application log data and/or the indicia of potential cyber security threats generated by the security monitor 112. Once the threat modeler 110 has trained the AI threat classification model, the threat modeler 110 connects to the AI threat detection module 114 for execution of the classification model.

The AI threat detection module 114 executes (206) the trained AI threat modeler against the application log data retrieved from database 118 and the indicia of potential cyber security threats received from the security monitor 112 to identify one or more indicia of actual cyber security threats. For example, the AI threat detection module 114 can use one or more attributes of the application log data and/or the indicia of potential cyber security threats as input to the trained classification model described above to both (i) identify previously undiscovered cyber security threats in the input data and (ii) validate certain of the potential cyber security threats identified at the security monitor 112 as actual threats or determine that certain of the of the potential cyber security threats identified at the security monitor 112 as non-threats. In this way, the AI threat detection module 114 can be configured to refine the initial set of potential cyber security threats into a set of actual cyber security threats that need remediation.

Once the AI threat detection module 114 has identified one or more indicia of actual cyber security threats, the AI threat detection module 114 determines (208) whether a remediation action exists for each of the identified actual cyber security threats. For example, the AI threat detection module 114 can correlate the identified actual cyber security threat to a software-based remediation action that resolves the threat by comparing the indicia of the identified threat to a database of remediation actions. In this context, a remediation action can be a portion of software functionality (including but not limited to source code) that, when executed, resolves or mitigates the cyber security threat (e.g., by preventing access, adding one or more layers of security (such as authentication), fixing or patching a software/hardware vulnerability, rolling back previously-executed transactions, and the like).

FIG. 7 is a workflow diagram of an exemplary method 700 of identifying one or more indicia of actual cyber security threats. As shown in FIG. 7, the AI threat detection module 114 uses the indicia of potential cyber security threats received (702) from the security monitor 112 as input for a code module that analyzes the indicia to determine whether an actual threat exists and whether a remediation action exists. In this example, the AI threat detection module 114 analyzes the indicia to determine whether the username of the user attempting to log in (i.e., Alice) is on a whitelist of allowed usernames. Because Alice is not an authorized username, the AI threat detection module 114 generates a remediation file (bayout lam generate) that restricts access to Alice's login attempt (e.g., by closing the ARN connection). The AI threat detection module 114 transmits the remediation file to, e.g., the remediation agent 103a at application server 103 for execution, as explained below.

For identified actual cyber security threats that have a remediation action, the AI threat detection module 114 transmits the remediation action to the remediation agent 103a at application server 103, and the remediation agent 103a executes (210) the remediation action at the application server 103 to resolve the identified actual cyber security threat. For identified actual cyber security threats that do not have a remediation action, the AI threat detection module 114 can take steps to generate a remediation action and transmit the action to the remediation agent 103a for execution on the applications server 103. The AI threat detection module 114 generates (212) one or more remediation parameters based upon the indicia of the actual cyber security threat. For example, the remediation parameters can be configuration parameters for the AI code generation module 116 that instruct the module 116 to write, aggregate, and/or compile specific source code into a remediation software package. In another example, the remediation parameters can be parameters that identify one or more external software modules or source code elements (e.g., GitHub-based code) that can be incorporated into a remediation software package.

The AI threat detection module 114 transmits the remediation parameters to the AI code generation module 116, which generates (214) source code for a remediation software package based upon the remediation parameters. For example, in some embodiments the AI code generation module 116 can leverage an AI-based code generation platform such as Bayou to receive the remediation parameters as input and generate source code based upon the parameters. Once the source code for the remediation software package is generated, the AI code generation module 116 transmits the software package to the application server 103, which executes (216) the remediation software package at the application server 103 to resolve the identified actual cyber security threat.

FIG. 3 is a detailed ladder diagram of a computerized method 300 of automated intelligent detection and mitigation of cyber security threats, using the system 100 of FIG. 1. The method 300 of FIG. 3 follows the same framework as the method 200 of FIG. 2, but provides additional detail regarding the particular functions of the modules described above with respect to FIG. 2.

As shown in FIG. 3, the application server 103 captures and sends (302) application log data associated with activity occurring in one or more communication sessions with the client computing device to the server computing device 106, where the log data is received by the data aggregator 108. As mentioned above, the data aggregator 108 can parse and format the application log data in a form that is usable by the security monitor 112 before transmitting the application log data to the security monitor 112. The security monitor 112 evaluates (304) the application log data received from the data aggregator 108 to identify one or more indicia of potential or probable cyber security threats.

Upon determining the indicia, the security monitor 112 advises (306) the AI threat detection module 114 on the potential or probable cyber security threats using, e.g., the indicia and the security monitor 112 further advises (308) the AI threat detection module 114 on one or more raw events identified in at least a portion of the application log data. The AI threat detection module 114 evaluates (310) the indicia and/or the raw event data received from the security monitor 112 to identify one or more actual cyber security threats, and based upon the evaluation, advises (312) the AI code generation module 116 of one or more remediation actions that should be taken to address the cyber security threats that were identified.

The AI code generation module 116 analyzes the remediation actions and determines (314) that one or more code modules exists to carry out the remediation actions. As mentioned above, the AI code generation module 116 is configured to generate code for the remediation actions if the code does not already exist. The AI code generation module 116 transmits the selected code modules for the remediation actions and sends (316) the code modules back to the remediation agent 103a on application server 103.

The remediation agent 103a executes (318) the received code modules on the application server 103 to, e.g., change one or more application settings, update one or more security policies, block one or more communications channels or ports, deactivate or restrict one or more user accounts, replace one or more existing application code modules with updated code, and the like in order to address the cyber security threats. After executing the code modules, the remediation agent 103a determines whether the cyber security threats are neutralized and, if the threats are neutralized, the agent 103a advises (320) the AI threat detection module 114 accordingly. The AI threat detection module 114 then provides (322) feedback to the AI code generation module 116 when the code modules are successful in mitigating the cyber security threats. The AI code generation module 116 can then store the code modules in association with the cyber security threats so that in the future, the AI code generation module 116 is equipped to provide these code modules in response to the same or similar cyber security threats.

Below is an exemplary use case for automated intelligent detection and mitigation of cyber security threats as described herein. An authorized user at client computing device 102 can access application functionality at application server 103 as described above, and the application server 103 can record and learn the authorized user's behavior and activity patterns over time. At one point, a fraudulent user may capture one or more aspects of the authorized user's access data and/or demographic data (e.g., via social engineering, hacking, or similar techniques). The fraudulent user may attempt to access the application functionality at application server 103 using the captured data that relates to the authorized user. For example, the fraudulent user may attempt to open a new financial account using the stolen identity of the authorized user. The new account may have no funds in it, but the fraudulent user may then attempt to transfer funds from one or more of the authorized user's legitimate accounts to the fraudulent account.

The application server 103 transmits the session activity data (i.e., application logs) relating to the fraudulent user's attempt to access the application functionality, to server computing device 106 for analysis and remediation as described above. The AI threat detection module 114 detects the activity pattern of the fraudulent user as representing an actual cyber security threat (e.g., because the authorized user does not typically open new accounts in this manner), and determines whether a remediation action exists for this type of threat. For example, the AI threat detection module 114 can determine that, for new account requests, a software package exists that requires two-factor authentication at the client device being used by the user that is requesting the new account. The AI threat detection module 114 can transmit the software package to the application server 103 for execution, which transmits a request to the client device of the fraudulent user for additional authentication credentials (e.g., a numeric code sent to a mobile phone number assigned to the authorized user). Because the fraudulent user cannot provide the authentication credentials, he or she is unable to create the new account. However, when the authorized user attempts to open a new account, the two-factor authentication package is executed and the authorized user is able to provide the necessary credentials to open the new account.

If a remediation does not exist for the threat (e.g., the fraudulent user is attempting to perform an action that does not currently have a remediation software package available), the AI threat detection module 114 generates remediation parameters based upon the action attempted by the fraudulent user and transmits the parameters to the AI code generation module 116, which creates a new remediation software package and transmits the new package to the application server 103 for execution, as described previously. At this point, the system 100 now has a new remediation software package that can be used to mitigate subsequent cyber security threats that relate to the action that was taken by the fraudulent user.

Below is a second exemplary use case for automated intelligent detection and mitigation of cyber security threats as described herein. An authorization module at application server 103 receives a connection request from a client computing device 102 along with one or more login credentials and determines that the login attempt is unauthorized. The application server 103 records one or more data elements associated with the login attempt (e.g., IP address of the client computing device, timestamp, login credentials, etc.) in an application log file and transmits the log file data to the data aggregator 108. The security monitor 112 identifies the unauthorized login attempt as a potential cyber security threat and provides the related data to the AI threat detection module 114. The AI threat detection module 114 utilizes the AI cyber security threat data 118b as received from the threat modeler 110 to determine if the unauthorized login attempt is an actual cyber security threat and, if so, instructs the AI code generation module 116 to select and/or generate one or more code modules to remediate the threat. For example, the module 116 can generate a new Identity and Access Management (IAM) policy in order to block the client computing device 102 and/or one or more accounts or security groups associated with the unauthorized login attempt.

Figure 8:
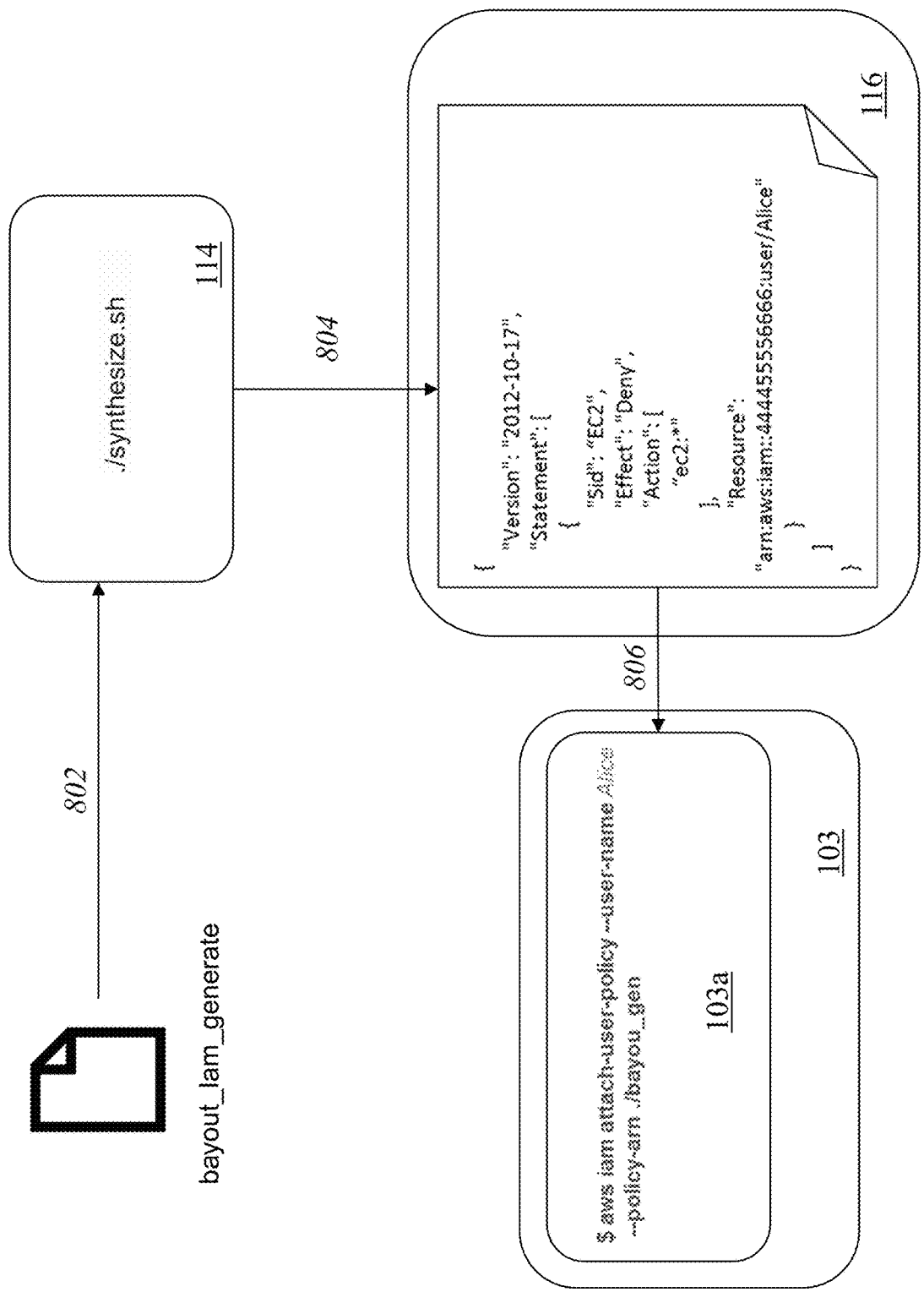
FIG. 8 is a workflow diagram of an exemplary method for changing an IAM policy on the application server in view of an actual cyber security threat.

The AI code generation module 116 transmits the code modules to the remediation agent 103a on application server 103, and the agent 103a executes the code modules (e.g., changes the IAM policy on the application server 103 to match the IAM policy generated by the AI code generation module 116) to block the client computing device 102 from accessing functionality on the application server 103. FIG. 8 is a workflow diagram of an exemplary method for changing an IAM policy on the application server 103 in view of an actual cyber security threat. As shown in FIG. 8, the indicia of potential cyber security threats are received (802) by the AI threat detection module 114 which executes a synthesize function (e.g., via an AWS Lambda operation) to instruct (804) the AI code generation module 116 to generate a revised IAM security policy to prevent Alice from logging in. The AI code generation module 116 transmits (806) the IAM security policy to the remediation agent 103a on application server 103, and the agent 103a applies the policy to, e.g., a login process to remediate the cyber security threat.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated intelligent detection and mitigation of cyber security threats, the system comprising a server computing device comprising a memory to store computer-executable instructions and a processor that executes the computer-executable instructions to:

receive application log data from one or more application servers, the application log data comprising one or more login events consisting of a plurality of attributes, each attribute including a key-value pair;

analyze the application log data to identify a set of one or more indicia of potential cyber security threats, including, for each login event, filtering the plurality of attributes to identify a subset of attributes that indicate a potential cyber security threat and generating output data that comprises the subset of attributes;

train an artificial intelligence (AI) threat modeler on known cyber security threat data to detect patterns and identify similarities between the known cyber security threat data and security threats indicated in the application log data and the subset of attributes that indicate a potential cyber security threat;

execute the trained AI threat modeler using the application log data and the set of one or more indicia of potential cyber security threats as input to (i) identify previously undiscovered cyber security threats in the application log data as potential cyber security threats and (ii) validate one or more of the potential cyber security threats as actual cyber security threats and determine that one or more of the potential cyber security threats are non-threats based upon the set of one or more indicia;

determine whether a remediation action exists for each of the identified actual cyber security threats by correlating the identified actual cyber security threat to a remediation action using the indicia of the identified actual cyber security threat;

when a remediation action exists for of the identified actual cyber security threat, execute the remediation action at the one or more application servers to resolve the identified actual cyber security threat, wherein the remediation action comprises one or more of: updating a security policy, blocking a communications channel or port, changing one or more application settings, deactivating one or more user accounts, or replacing one or more existing application code modules with updated code module; and when a remediation action does not exist for the identified actual cyber security threat:
  generate one or more remediation parameters based upon the one or more indicia of the actual cyber security threat, wherein the remediation parameters comprise (i) configuration parameters for an AI-based code generator to generate a new remediation software package and (ii) resource parameters that identify one or more externally-hosted software modules for incorporation into the new remediation software package;
  generate, using an AI-based code generator, one or more newly-created source code modules based upon the one or more remediation parameters that, when executed, directly remediate the identified actual cyber security threat, and incorporate the newly-created source code modules into the new remediation software package;
  retrieve the identified software modules from an external host computer using the resource parameters and incorporating the identified software modules into the new remediation software package; and
  execute the remediation software package at the one or more application servers to resolve the identified actual cyber security threat.

2. The system of claim 1, wherein the application log data comprises one or more communication events between one or more of the application servers and a remote computing device.

3. The system of claim 1, wherein the server computing device receives the application log data in real time.

4. The system of claim 1, wherein execution of the remediation software package at the one or more application servers to resolve the identified actual cyber security threat comprises: updating a security policy, blocking a communications channel or port, changing one or more application settings, deactivating one or more user accounts, or replacing one or more existing application code modules with updated code modules.

5. The system of claim 4, wherein execution of the remediation software package at the one or more application servers to resolve the identified actual cyber security threat comprises:
  changing an Identity and Access Management (IAM) policy on the one or more application servers to match a newly-created IAM policy generated by the AI-based code generator; and
  applying the newly-created IAM policy to a login process on the one or more application servers to prevent a remote computing device from logging into the one or more application servers.

6. A computerized method of automated intelligent detection and mitigation of cyber security threats, the method comprising:
  receiving, by a server computing device, application log data from one or more application servers, the application log data comprising one or more login events consisting of a plurality of attributes, each attribute including a key-value pair;
  analyzing, by the server computing device, the application log data to identify a set of one or more indicia of potential cyber security threats, including, for each login event, filtering the plurality of attributes to identify a subset of attributes that indicate a potential cyber security threat and generating output data that comprises the subset of attributes;
  training, by the server computing device, an artificial intelligence (AI) threat modeler on known cyber security threat data to detect patterns and identify similarities between the known cyber security threat data and security threats indicated in the application log data and the subset of attributes that indicate a potential cyber security threat;
  executing, by the server computing device, the trained AI threat modeler using the application log data and the set of one or more indicia of potential cyber security threats as input to (i) identify previously undiscovered cyber security threats in the application log data as potential cyber security threats and (ii) validate one or more of the potential cyber security threats as actual cyber security threats and determine that one or more of the potential cyber security threats are non-threats based upon the set of one or more indicia;
  determining, by the server computing device, whether a remediation action exists for each of the identified actual cyber security threats by correlating the identified actual cyber security threat to a remediation action using the indicia of the identified actual cyber security threat;

when a remediation action exists for of the identified actual cyber security threat, executing, by the server computing device, the remediation action at the one or more application servers to resolve the identified actual cyber security threat, wherein the remediation action comprises one or more of: updating a security policy, blocking a communications channel or port, changing one or more application settings, deactivating one or more user accounts, or replacing one or more existing application code modules with updated code module; and when a remediation action does not exist for the identified actual cyber security threat:
  generating, by the server computing device, one or more remediation parameters based upon the one or more indicia of the actual cyber security threat, wherein the remediation parameters comprise (i) configuration parameters for an AI-based code generator to generate a new remediation software package and (ii) resource parameters that identify one or more externally-hosted software modules for incorporation into the new remediation software package;
  generating, by the server computing device using an AI-based code generator, one or more newly-created source code modules based upon the one or more remediation parameters that, when executed, directly remediate the identified actual cyber security threat, and incorporating the newly-created source code modules into the new remediation software package;
  retrieving, by the server computing device, the identified software modules from an external host computer using the resource parameters and incorporating the identified software modules into the new remediation software package; and
  executing, by the server computing device, the new remediation software package at the one or more application servers to resolve the identified actual cyber security threat.

7. The method of claim 6, wherein the application log data comprises one or more communication events between one or more of the application servers and a remote computing device.

8. The method of claim 6, wherein the server computing device receives the application log data in real time.

9. The method of claim 6, wherein execution of the remediation software package at the one or more application servers to resolve the identified actual cyber security threat comprises: updating a security policy, blocking a communications channel or port, changing one or more application settings, deactivating one or more user accounts, or replacing one or more existing application code modules with updated code modules.

10. The method of claim 9, wherein execution of the remediation software package at the one or more application servers to resolve the identified actual cyber security threat comprises:
  changing an Identity and Access Management (IAM) policy on the one or more application servers to match a newly-created IAM policy generated by the AI-based code generator; and
  applying the newly-created IAM policy to a login process on the one or more application servers to prevent a remote computing device from logging into the one or more application servers.

* * * * *